(12) United States Patent
Ewing (10) Patent No.: US 10,875,625 B2
(45) Date of Patent: Dec. 29, 2020

(54) CO-CURED SPAR AND STRINGER CENTER WING BOX

(71) Applicant: THE BOEING COMPANY, Chicago, IL (US)

(72) Inventor: Richard F. Ewing, Everett, WA (US)

(73) Assignee: THE BOEING COMPANY, Chicago, IL (US)

( * ) Notice: Subject to any disclaimer, the term of this patent is extended or adjusted under 35 U.S.C. 154(b) by 296 days.

(21) Appl. No.: 15/683,929

(22) Filed: Aug. 23, 2017

(65) Prior Publication Data

US 2019/0061906 A1 Feb. 28, 2019

(51) Int. Cl.
| | |
|---|---|
| *B64C 3/20* | (2006.01) |
| *B64C 3/18* | (2006.01) |
| *B64C 3/26* | (2006.01) |
| *B64C 1/26* | (2006.01) |
| *B29D 99/00* | (2010.01) |
| *B29L 31/30* | (2006.01) |

(52) U.S. Cl.
CPC .............. *B64C 3/20* (2013.01); *B64C 1/26* (2013.01); *B64C 3/182* (2013.01); *B64C 3/185* (2013.01); *B64C 3/26* (2013.01); *B29D 99/001* (2013.01); *B29L 2031/3085* (2013.01)

(58) Field of Classification Search
CPC ........... B64C 3/18; B64C 3/182; B64C 3/185; B64C 3/20; B64C 3/26
See application file for complete search history.

(56) References Cited

U.S. PATENT DOCUMENTS

| | | | |
|---|---|---|---|
| 6,190,484 B1* | 2/2001 | Appa | B29C 70/32 156/189 |
| 7,861,969 B2 | 1/2011 | Guzman et al. | |
| 2009/0317587 A1 | 12/2009 | Deobald et al. | |
| 2011/0299993 A1* | 12/2011 | Soula | B29C 70/207 416/226 |
| 2014/0133987 A1* | 5/2014 | Guinaldo Fernandez | B64C 3/28 416/131 |

(Continued)

FOREIGN PATENT DOCUMENTS

| | | |
|---|---|---|
| EP | 2687436 A1 | 1/2014 |
| EP | 2735504 A1 | 5/2014 |

(Continued)

OTHER PUBLICATIONS

Boeing Proprietary, Co-Cure Upper Panel Development Small Rounded Hats (SRH) 101.

(Continued)

*Primary Examiner* — Nicholas McFall
(74) *Attorney, Agent, or Firm* — Marshall, Gerstein & Borun LLP (57) ABSTRACT

A center wing box assembly for an aircraft which includes: a composite lower wing skin, a composite upper wing skin and a composite spar which extends between the composite lower wing skin and the composite upper wing skin. The center wingbox assembly further includes a composite stringer which extends along a web of the composite spar in a wing span direction. The composite spar has a co-cure securement with the composite lower wing skin and with the composite upper wing skin and the composite stringer has a co-cure securement with the web of the composite spar.

20 Claims, 8 Drawing Sheets

(56) References Cited

U.S. PATENT DOCUMENTS

2017/0259519 A1* 9/2017 Abe .................. B29C 70/06

FOREIGN PATENT DOCUMENTS

| EP | 3045384 A1 | 7/2016 |
|---|---|---|
| WO | WO-2014118538 A2 | 8/2014 |

OTHER PUBLICATIONS

Extended European Search Report for EP Application No. 18184091 dated Dec. 7, 2018.
Communication Pursuant to Article 94(3) EPC dated Dec. 20, 2019 for EP Application No. 18184091.9.
Communication Pursuant to Article 94(3) EPC for EP Application No. 18184091.9 dated Jul. 8, 2020.

* cited by examiner

CO-CURED SPAR AND STRINGER CENTER WING BOX

FIELD

This disclosure relates to a center wing box of a wing assembly for an aircraft and more particularly to a co-cured center wing box assembly.

BACKGROUND

A wingbox is a structural component of an aircraft which provides support and rigidity to the wings of the aircraft. The design of the wingbox will vary depending on the size and function of the aircraft and is generally positioned between the wing roots to which the wings attach. The wingbox is one of the strongest sections of the fuselage and will often include a number of supportive spars.

The wingbox is positioned between and connected to the wings. The wingbox will experience shear stresses with the aircraft on the ground from the weight of the wings themselves and from the fuel contained within the wings. The wingbox will experience stresses such as tension, compression, shear and torsion with the aircraft in operation. The wingbox absorbs some of these stresses the wings experience and provides a stabilized support for the wings. In addition, the wingbox location, since it is typically designed to accommodate concentrated stresses transmitted from the wings, is well suited as an area to position landing gear in contrast to developing a secondary area that would require additional strength and reinforcements.

In designing and fabricating the wingbox, fabricators are looking to fabricate the wingbox to have inexpensive, lightweight and strong constructions so as to optimize operation and value of the aircraft. Currently, existing composite wingbox constructions are limited to include separate structural elements, joined with mechanical fasteners, or less expensive but simple co-cured securements of elements made up of flat sections. The gages of the flat sections are required to be relatively thick so as to provide the required stability to the wings which are experiencing concentrated shear stress loadings. As a result, this relatively thick construction adds additional weight to the aircraft and can take up additional space resulting in limiting room for cargo and/or passengers.

There is a need to provide a less expensive, strong and light wingbox composite construction. A construction which will provide the stability of accommodating loads and stresses received from the wings and which will optimize value and operations of the aircraft.

SUMMARY

An example includes a center wing box assembly for an aircraft includes a composite lower wing skin, a composite upper wing skin, a composite spar which extends between the composite lower wing skin and the composite upper wing skin and a composite stringer which extends along a web of the composite spar in a wing span direction. The composite spar has a co-cure securement with the composite lower wing skin and with the composite upper wing skin. The composite stringer has a co-cure securement with the web of the composite spar.

An example includes a center wing box assembly for an aircraft includes a composite lower wing skin, a composite upper wing skin and a composite spar which extends between the composite lower wing skin and the composite upper wing skin. Further included is at least one: of a first composite stringer which extends along the composite lower wing skin or a second composite stringer which extends along the composite upper wing skin. The composite spar has a co-cure securement with the composite lower wing skin and the composite upper wing skin. The at least one of the first composite stringer has a co-cure securement with the composite lower wing skin or the second composite stringer has a co-cure securement with the composite upper wing skin.

An example includes a method for assembling a center wing box assembly for an aircraft, which includes the steps of laying up a composite lower wing skin, laying up a composite upper wing skin and laying up a composite spar positioned extending between the composite lower wing skin and the composite upper wing skin. The method further includes laying up at least one of a composite stringer positioned to extend along a web of the composite spar in a wing span direction, laying up a first composite stringer positioned to extend along the composite lower wing skin in the wing span direction or laying up a second composite stringer to extend along the composite upper wing skin in the wing span direction. The method further includes co-curing the composite spar into securement with the composite lower wing skin and with the composite upper wing skin and further co-curing into securement at least one of the composite stringer with the web of the composite spar, the first composite stringer with the composite lower wing skin or the second composite stringer with the composite upper wing skin.

The features, functions, and advantages that have been discussed can be achieved independently in various embodiments or may be combined in yet other embodiments further details of which can be seen with reference to the following description and drawings.

DESCRIPTION

As discussed earlier there is a need to fabricate a wingbox assembly which is less expensive, strong and light in weight. In the interest of making a wingbox less expensive strong and light in weight a wingbox construction described herein will selectively utilize a composite stringer structure in association with at least one of composite upper wing skins, composite lower wing skins and composite spars. This resulting composite assembly will have a co-cured securement of the parts to the wingbox construction. This wingbox construction will result in a cost effective and light wingbox construction which has an optimal strength provided by co-cure securement of the parts within the wingbox assembly.

Figure 1:
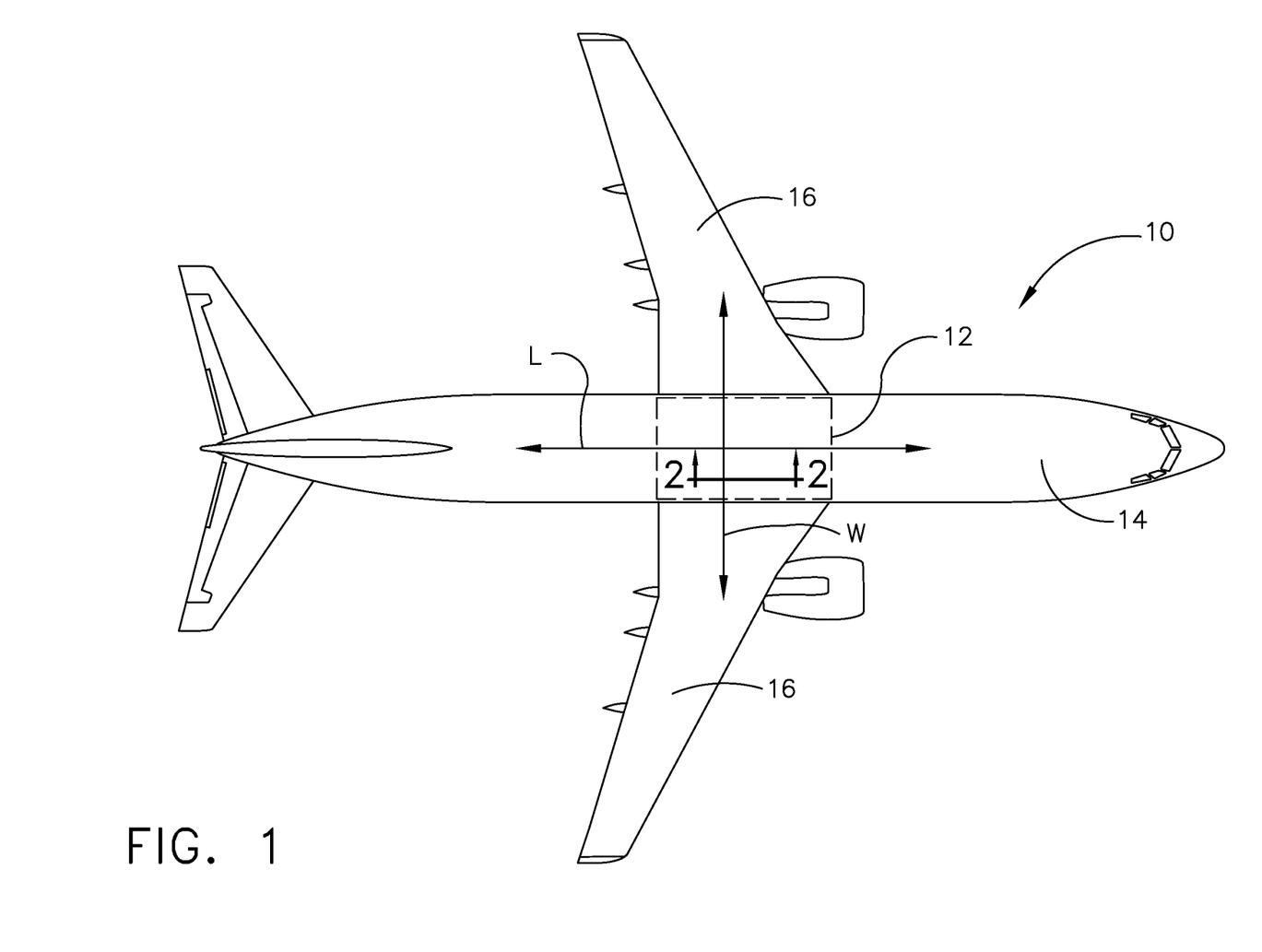
FIG. 1 is a top plan view of an aircraft with the location of center wingbox indicated in a dashed line representation.

In referring to FIG. 1, aircraft 10 has wingbox assembly 12, in this example, positioned within fuselage 14. Wingbox assembly 12 is secured to and positioned between wings 16 and provides support and rigidity to wings 16 of aircraft 10, as discussed earlier. Wing span W indicates the direction of the wing span of wings 16 which is a direction generally transverse to a longitudinal axis L of aircraft 10.

Figure 2:
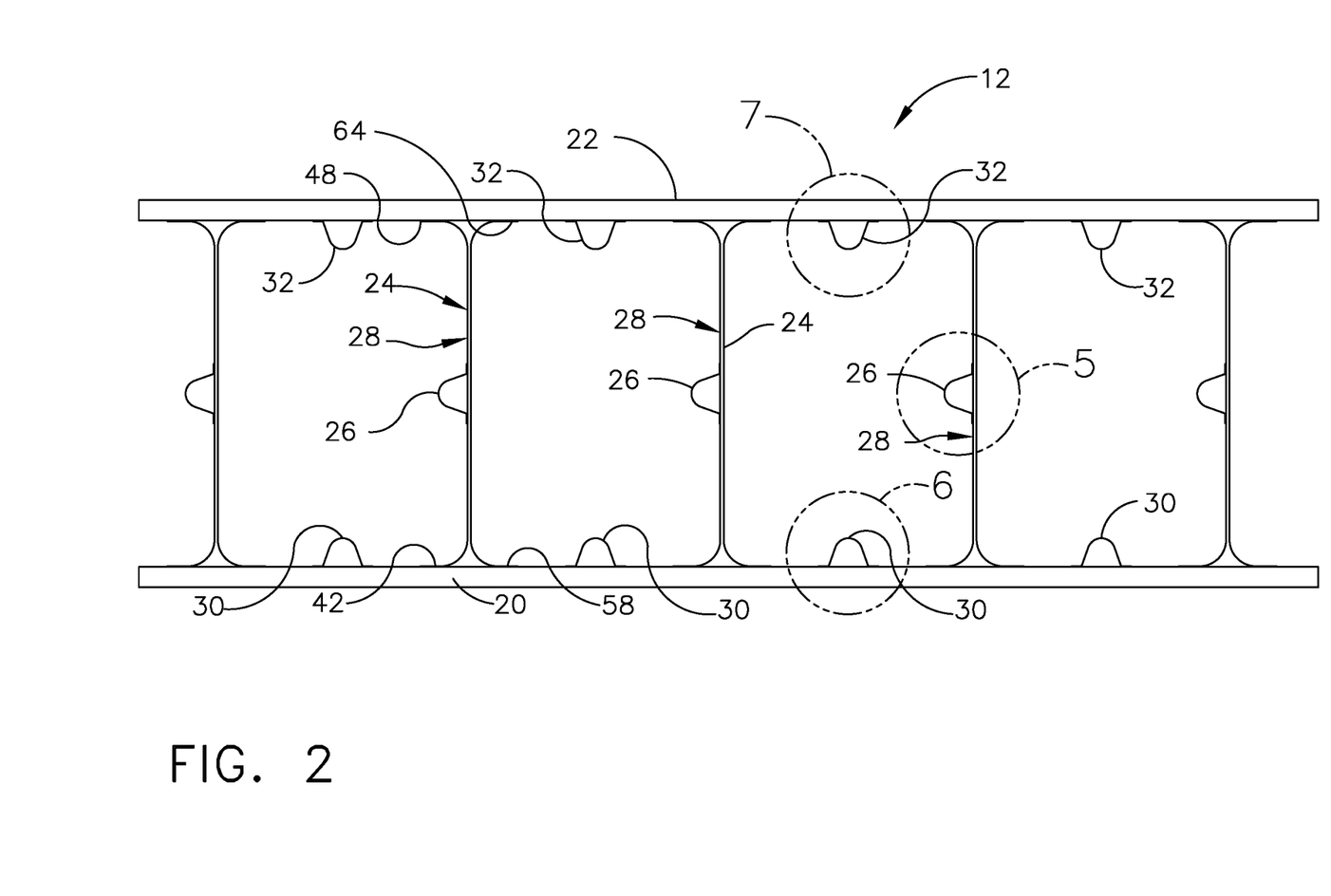
FIG. 2 is a partial cross section view of center wing box as seen along line 2-2 in FIG. 1.

In referring to FIG. 2, center wingbox assembly 12 for aircraft 10 includes composite lower wing skin 20 and composite upper wing skin 22. Further included in center wingbox assembly 12 is composite spar 24 which extends between composite lower wing skin 20 and composite upper wing skin 22. In this first example of center wingbox assembly 12, composite stringer 26 extends along web 28 of composite spar 24 in wing span direction W, as shown in FIG. 1. In this example, composite stringer 26 abuts web 28 as composite stringer 26 extends along web 28, in an alternative example of this first example, composite stringer 26 can also extend along web 28 with a composite layer (not shown) positioned between composite stringer 26 and web 28. Composite spar 24 has a co-cure securement with composite lower wing skin 20 and also with composite upper wing skin 22. In addition, composite stringer 26 has a co-cure securement with web 28 of composite spar 24. The co-cure securement of composite stringer 26 with web 28 can also include the above mentioned composite layer (not shown) positioned between composite stringer 26 and web 28. In this first example, one composite stringer 26 is employed on each composite spar 24 however the fabricator can select to have one or more composite stringers 26 on selected composite spars 24. In some instances, the fabricator may select a particular composite spar 24 will not employ a composite stringer 26. The employment of composite stringers 26 with respect to the composite spars 26 will depend on the loads wingbox assembly 12 will receive from wings 16.

In addition to employment of one or more composite stringers 26 in association with composite spars 24 in this first example of center wingbox assembly 12, at least one of: first composite stringer 30 which extends along composite lower wing skin 20 or second composite stringer 32 which extends along composite upper wing skin 22 is selectively employed. The fabricator can determine the support needed with respect to lower wing skin 20 and upper wing skin 22. As a result, the fabricator will employ the number and positioning of first composite stringers 30 with respect to lower wing skin 20 and/or the number and positioning of second composite stringers 32 with respect to upper wing skin 22. In an instance of employing either or both first composite stringers 30 and/or second composite stringers 32, first composite stringer 30 extends in wing span direction W and would have a co-cure securement with composite lower wing skin 20 and second composite stringer 32 extends in wing span direction W and would have a co-cure securement with composite upper wing skin 22.

Figure 3:
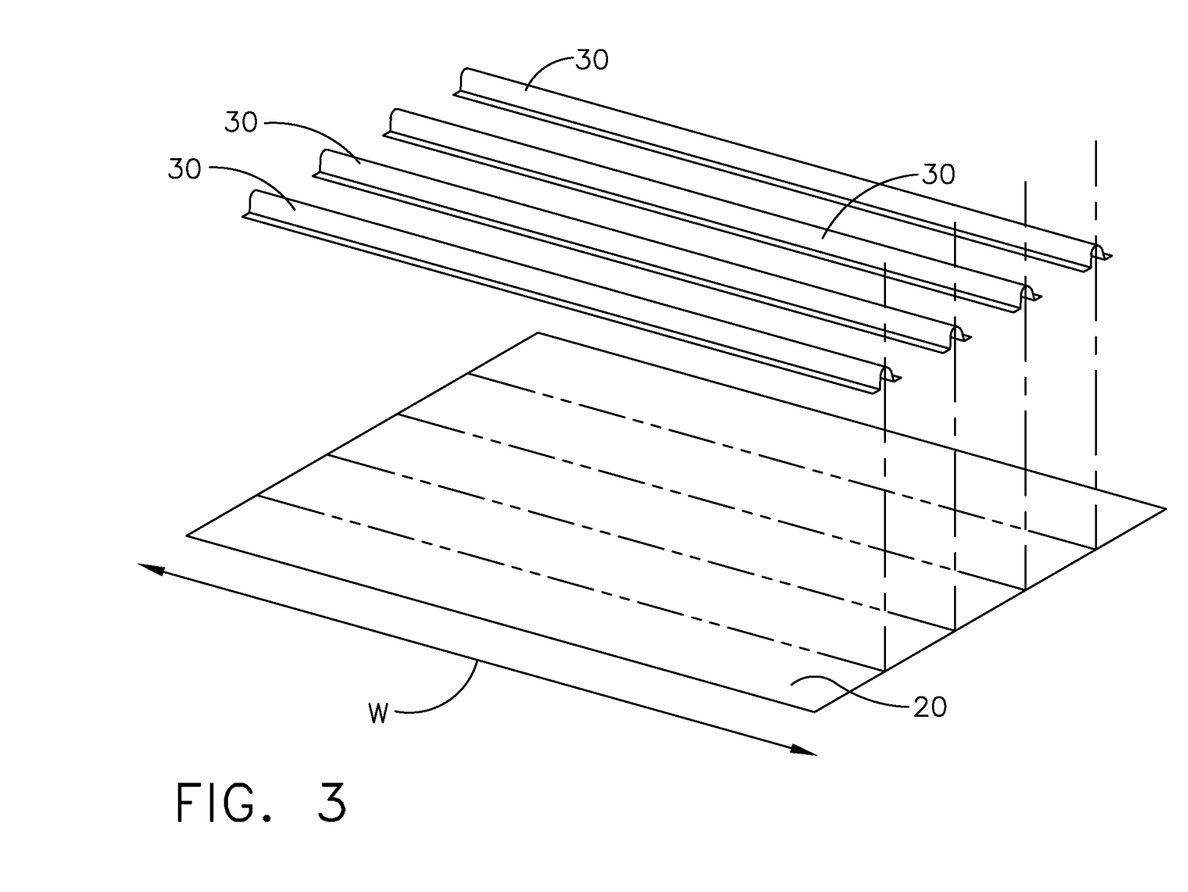
FIG. 3 is a partial perspective exploded view of first composite stringers and a lower composite wing skin of the center wing box of FIG. 2.

As shown in FIG. 3, an example of first composite stringers 30 are shown positioned in relationship to lower wing skin 20 wherein first composite stringers 30 extend in wing span direction W. In an application of second composite stringers 32, second composite stringers 32, as seen in FIG. 2, would be similarly positioned with respect to upper wing skin 22 as first composite stringers 30 and lower wing skin 20 but in an inverted position to that shown in FIG. 3.

Figure 4:
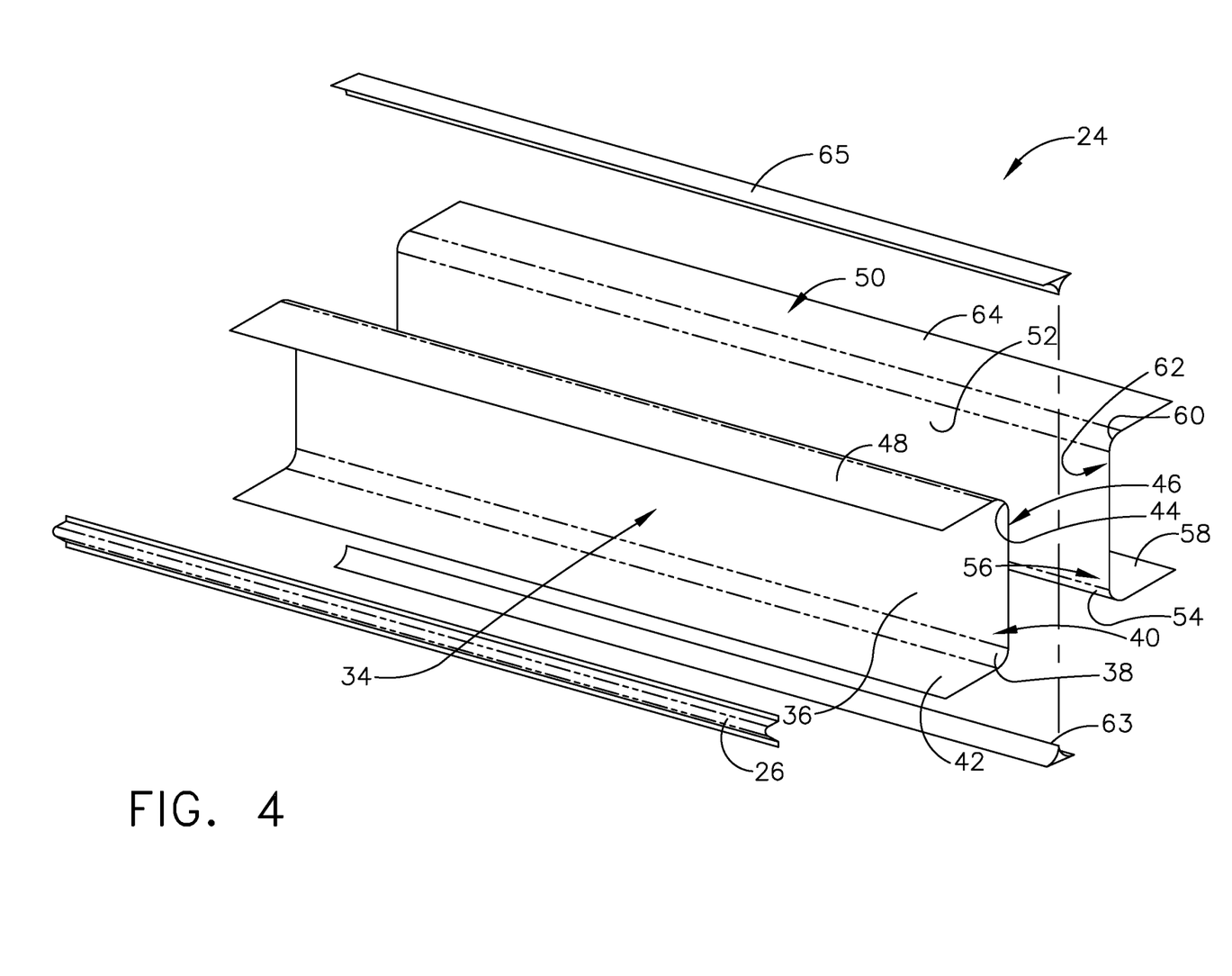
FIG. 4 is a perspective exploded view of a composite spar of the center wing box.

In referring to FIG. 4, composite spar 24 includes first composite trough configuration 34 includes first web 36. First curved transition wall portion 38 extends from first end portion 40 of first web 36 to first flange 42 of first composite trough configuration 34. First flange 42 extends along composite lower wing skin 20, as seen in FIG. 2. Second curved transition wall portion 44 extends from second end portion 46 of first web 36 to second flange 48 of first composite trough configuration 34. Second flange 48 extends along composite upper wing skin 22, as seen in FIG. 2. Composite spar 24 further includes second composite trough configuration 50 which has second web 52. First curved transition wall portion 54 extends from first end portion 56 of second web 50 to first flange 58 of second composite trough configuration 50. First flange 58 extends along composite lower wing skin 20, as seen in FIG. 2. Second curved transition wall portion 60 extends from second end portion 62 of second web 52 to second flange 64 of second composite trough configuration 50. Second flange 64 of second composite trough configuration 50 extends along composite upper wing skin 22, as seen in FIG. 2.

Composite spar 24 includes first web 36 of first composite trough configuration 34 abuts and has a co-cure securement with second web 52 of second composite trough configuration 50 as seen in FIG. 4. First flange 42 of first composite trough configuration 34 has a co-cure securement with composite lower wing skin 20. First flange 58 of second composite trough configuration 50 has a co-cure securement with composite lower wing skin 20. Second flange 48 of first composite trough configuration 34 has a co-cure securement with composite upper wing skin 22. Second flange 64 of second composite trough configuration 50 has a co-cure securement with composite upper wing skin 22. In the example shown in FIG. 2, each of first flange 42 and first flange 58 extend along and abut composite lower wing skin 20 and second flange 48 and second flange 64 extend along and abut composite upper wing skin 22.

In an alternative example, each of first flange 42 and first flange 58 extend along composite lower wing skin 20 with a composite layer (not shown) positioned between first flange 42 and first flange 58 on the one hand and composite lower wing skin 20 on the other hand. Similarly, in an alternative example, each of second flange 48 and second flange 64 extend along composite upper wing skin 22 with a composite layer (not shown) positioned between second flange 48 and second flange 68 on the one hand and composite upper wing skin 22 on the other hand. The co-cure securement of first flange 42 and first flange 58 in this alternative example includes the composite layer (not shown). Similarly the co-cure securement of second flange 48 and second flange 64 in this alternative example includes the composite layer (not shown).

Figure 5:
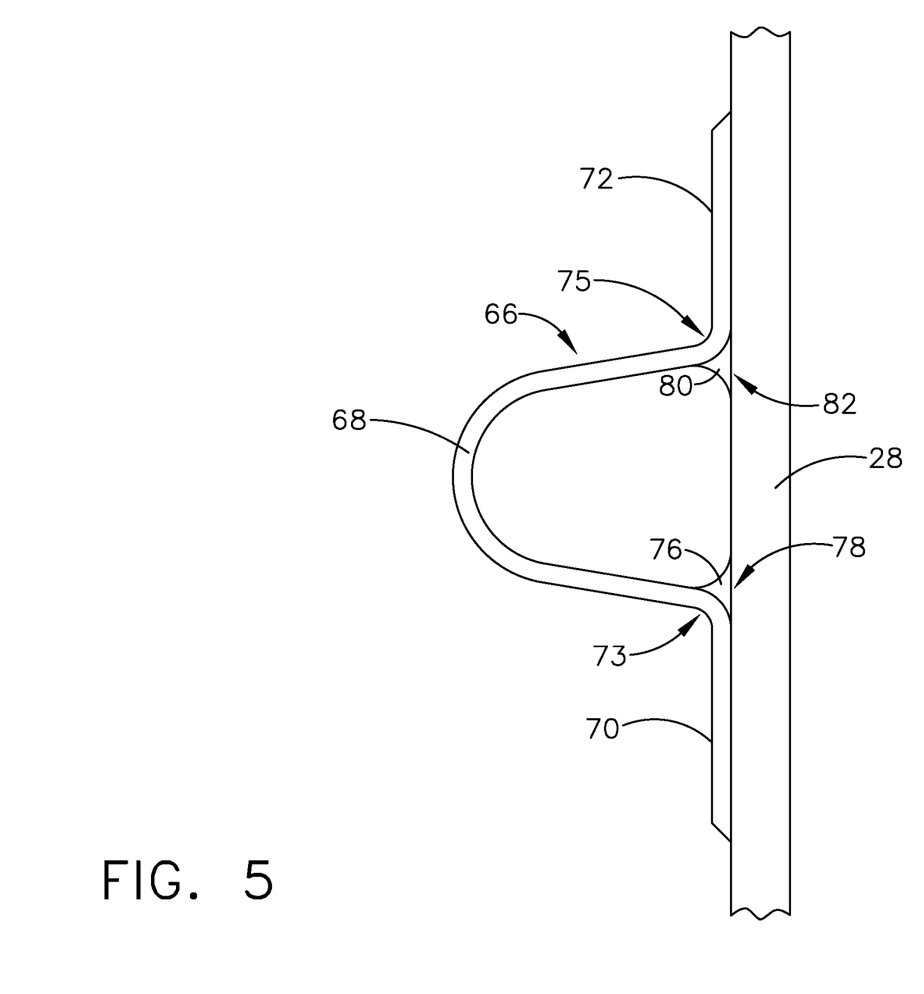
FIG. 5 is an enlarged view of a composite stringer in co-cure securement with the web of spar as circled and identified as 5 in FIG. 2.

Composite stringer 26 associated with web 28 includes hat stringer 66, as seen in FIG. 5. Other known configurations of stringers can be employed. Hat stringer 66 includes cap portion 68 and first curved hat stringer transition wall portion 73 positioned between cap portion 68 and first leg 70. Second curved hat stringer transition wall portion 75 positioned between cap portion 68 and second leg 72. As seen in FIG. 5, first and second legs 70, 72 extend in opposite directions relative to cap portion 68 and first and second legs each extend along web 28 of composite spar 24. In this example, first and second legs 70, 72 abut web 28. As mentioned earlier, in an alternative example, a composite layer (not shown) can be positioned between first and second legs 70, 72 on the one hand and web 28 on the other hand wherein each of first and second legs 70, 72 extend along web 28. The co-cure securement of hat stringer 66 with web 28 includes co-cure of first and second legs 70, 72 in abutting relationship with web 28 and can include in an alternative example a composite layer (not shown) positioned between first and second legs 70, 72 on the one hand and web 28 on the other hand.

First composite radius filler member 76 is positioned adjacent to location 78 of first curved hat stinger transition wall portion 73 of hat stringer 66. Second composite radius filler member 80 is positioned adjacent to location 82 of second curved hat stinger transition wall portion 75 of hat stringer 66. In the example shown in FIG. 5, first and second composite radius filler members 76 and 80 are both positioned between hat stringer 66 and web 28. In an alternative example, first and second composite radius filler members 76 and 80 are both positioned between hat stringer 66 and a composite layer (not shown) overlying a portion of web 28.

A second example of center wing box assembly 12 for aircraft 10 includes as seen in FIG. 2 composite lower wing skin 20, composite upper wing skin 22 and composite spar 28 which extends between composite lower wing skin 20 and composite upper wing skin 22. At least one of: a first composite stringer 30 which extends along composite lower wing skin 20 or a second composite stringer 32 which extends along composite upper wing skin 22. Composite spar 24 has a co-cure securement with composite lower wing skin 20 and composite upper wing skin 22. The at least one of first composite stringer 30 has a co-cure securement with composite lower wing skin 20 or second composite stringer 32 has a co-cure securement with composite upper wing skin 22.

Figure 6:
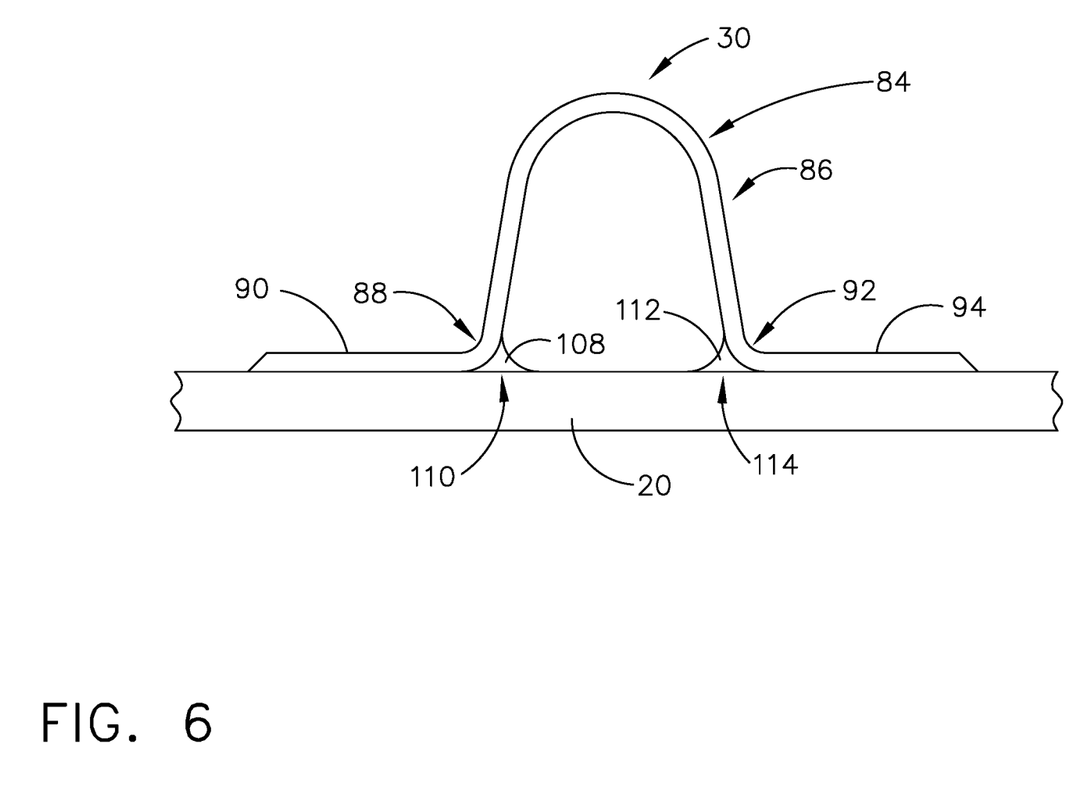
FIG. 6 is an enlarged view of first composite stringer in co-cure securement with composite lower wing skin as circled and identified as 6 in FIG. 2.
Figure 7:
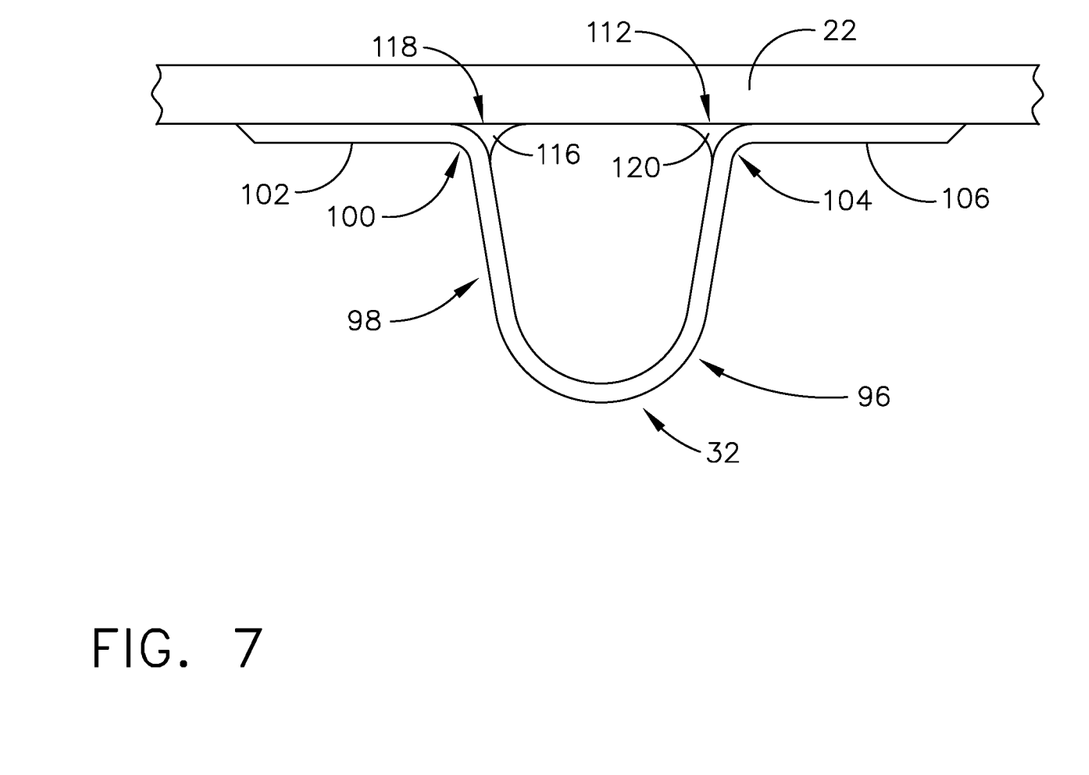
FIG. 7 is an enlarged view of second composite stringer in co-cure securement with upper composite wing skin as circled and identified as 7 in FIG. 2.

First composite stringer 30 and second composite stringer 32 in this second example as seen in FIG. 2 and seen in FIGS. 6 and 7 extend along respective composite lower and composite upper wing skins 20, 22 in abutting relationship with lower and upper wing skins 20, 22. The co-cure securement in this example includes this arrangement of abutting relationship of first composite stringer 30 with composite lower wing skin 20 and of second composite stringer 32 with upper wing skin 22 as they are selectively employed. In another example, which is applicable for both the first and second example of center wingbox assembly 12, first composite stringer 30 extends along lower wing skin 20 with a composite layer (not shown) positioned between first composite stringer 30 and lower wing skin 20. The co-cure securement of first composite stringer 30 with composite lower wing skin 20 includes composite layer (not shown) positioned between the first composite stringer 30 and composite lower wing skin 20. Similarly, in this example, second composite stringer 32 extends along upper wing skin 22 with a composite layer (not shown) positioned between the second composite stringer 32 and composite upper wing skin 22. The co-cure securement of second composite stringer 32 and composite upper wing skin 22 includes the composite layer (not shown) positioned between second composite stringer 32 and composite upper wing skin 22.

In addition to employment of at least one of: first composite stringer 30 which extends along the composite lower wing skin 20 or a second composite stringer 32 which extends along composite upper wing skin 22, composite stringer 26 can also be chosen to be included in wingbox assembly 12. The at least one of: first stringer 30 extends in wing span direction W or second stringer 32 extends in wing span direction W. Likewise should composite stringer 26 be used, composite stringer 26 extends in wing span direction was well. Also, as described earlier, composite stringer 26 is co-cured with web 28.

As described earlier for the first example of center wingbox assembly 12, second example of center wingbox assembly 12 similarly has composite spar 24, as seen in FIG. 4, which includes first composite trough configuration 34 includes first web 36. First curved transition wall portion 38 extends from first end portion 40 of first web 36 to first flange 42 of first composite trough configuration 34. First flange 42 extends along composite lower wing skin 20, as seen in FIG. 2. Second curved transition wall portion 44 extends from second end portion 46 of first web 36 to second flange 48 of first composite trough configuration 34. Second flange 48 extends along composite upper wing skin 22, as seen in FIG. 2. Composite spar 24 further includes second composite trough configuration 50 which has second web 52. First curved transition wall portion 54 extends from first end portion 56 of second web 50 to first flange 58 of second composite trough configuration 50. First flange 58 extends along composite lower wing skin 20, as seen in FIG. 2. Second curved transition wall portion 60 extends from second end portion 62 of second web 52 to second flange 64 of second composite trough configuration 50. Second flange 64 of second composite trough configuration 50 extends along composite upper wing skin 22, as seen in FIG. 2.

Composite spar 24 includes first web 36 of first composite trough configuration 34 abuts and has a co-cure securement with second web 52 of second composite trough configuration 50 as seen in FIG. 4. First flange 42 of first composite trough configuration 34 has a co-cure securement with composite lower wing skin 20. First flange 58 of second composite trough configuration 50 has a co-cure securement with composite lower wing skin 20. Second flange 48 of first composite trough configuration 34 has a co-cure securement with composite upper wing skin 22. Second flange 64 of second composite trough configuration 50 has a co-cure securement with composite upper wing skin 22. In the example shown in FIG. 2, each of first flange 42 and first flange 58 extend along and abut composite lower wing skin 20 and second flange 48 and second flange 64 extend along and abut composite upper wing skin 22.

In an alternative example, each of first flange 42 and first flange 58 extend along composite lower wing skin 20 with a composite layer (not shown) positioned between first flange 42 and first flange 58 on the one hand and composite lower wing skin 20 on the other hand. Similarly, in an alternative example, each of second flange 48 and second flange 64 extend along composite upper wing skin 22 with a composite layer (not shown) positioned between second flange 48 and second flange 68 on the one hand and composite upper wing skin 22 on the other hand. The co-cure securement of first flange 42 and first flange 58 in this alternative example includes the composite layer (not shown). Similarly the co-cure securement of second flange 48 and second flange 64 in this alternative example includes the composite layer (not shown).

In referring to FIGS. 2 and 6, first composite stringer 30 includes first hat stringer 84 which comprises first cap portion 86, first curved hat stringer transition wall portion 88 positioned between first cap portion 86 and first leg 90 and second curved hat stringer transition wall portion 92 positioned between first cap portion 86 and second leg 94. First and second legs 90, 94 extend in opposite directions relative to first cap portion 86. First and second legs each extend along composite lower wing skin 20. As seen in FIGS. 2 and 7, second composite stringer 32 includes second hat stringer 96 which includes second cap portion 98, first curved hat stringer transition wall portion 100 positioned between second cap portion 98 and first leg 102 and second curved hat stringer transition wall portion 104 positioned between second cap portion 98 and second leg 106. First and second legs 102 extend in opposite directions relative to second cap portion 98. First and second legs 102, 106 each extend along composite upper wing skin 22.

As seen in the example set forth in FIGS. 6 and 7, co-cure securement of first hat stringer 84 includes composite lower wing skin 20, wherein first and second leg portions 90, 94 are in co-cure securement with composite lower wing skin 20. Co-cure securement of the second hat stringer 96 includes composite upper wing skin 22, wherein first and second leg portions 102, 106 are in co-cure securement with composite upper wing skin 22.

In further referring to FIGS. 6 and 7, third composite radius filler member 108 is positioned adjacent to location 110 of first curved transition wall portion 100 of first hat stringer 84 and fourth composite radius filler member 112 is positioned adjacent to location 114 of second curved transition wall portion 92 of first hat stringer 84. Fifth composite radius filler member 116 is positioned adjacent to location 118 of first curved transition wall portion 100 of second hat stringer 96. Sixth composite radius filler member 120 is positioned adjacent to location 122 of second curved transition wall portion 104 of second hat stringer 96.

Figure 8:
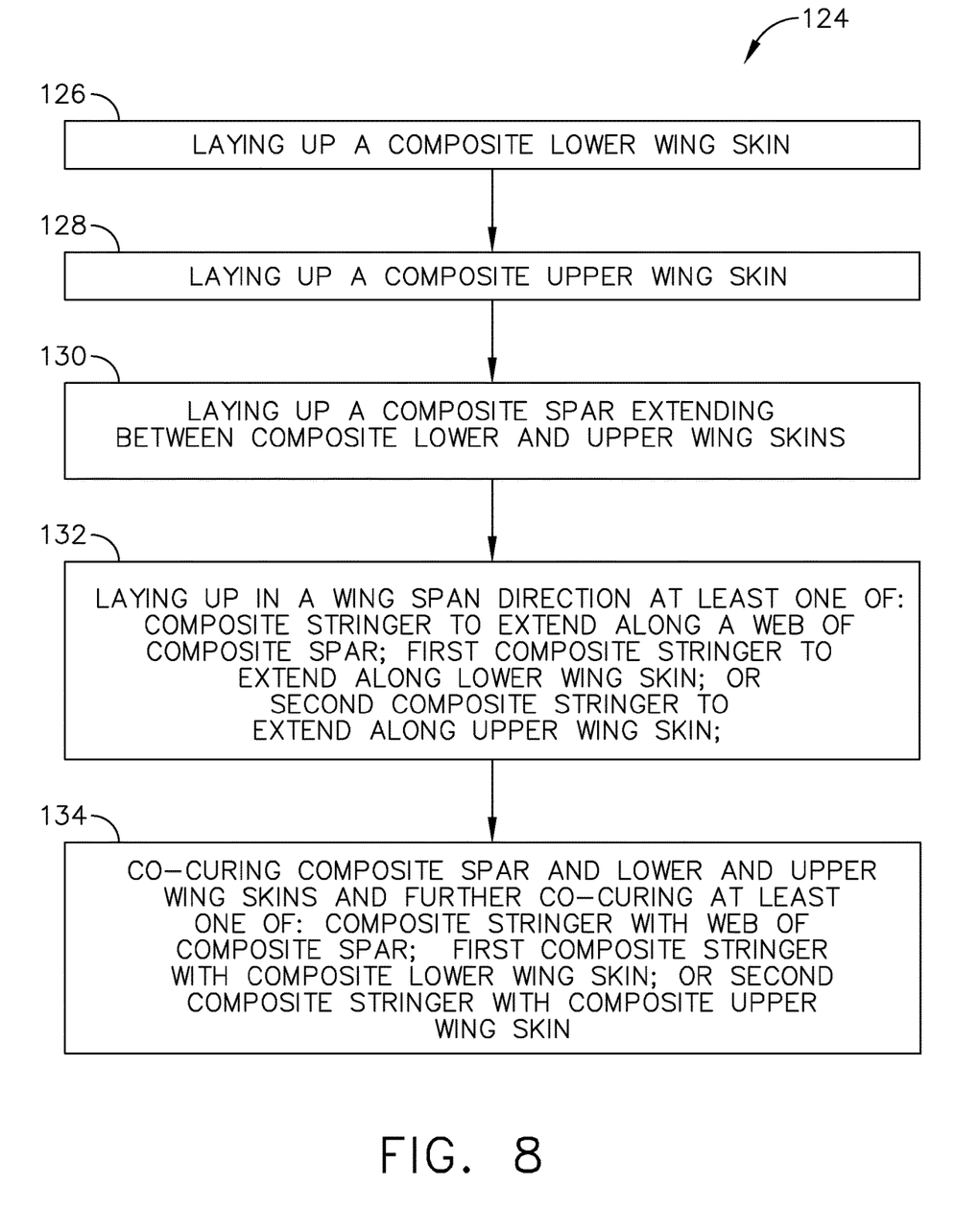
FIG. 8 is a flow chart for a method for assembling a center wing box assembly.

In referring to FIG. 8, method 124 for assembling center wing box assembly 12 for aircraft 10 includes step 126 for laying up composite lower wing skin 20, step 128 for laying up composite upper wing skin 22 and step 130 for laying up composite spar 24 positioned extending between composite lower wing skin 20 and composite upper wing skin 22. Method 124 further includes step 132 for laying up at least one of: composite stringer 26 positioned to extend along web 28 of composite spar 24 in wing span direction W; first composite stringer 30 to extend along composite lower wing skin 20 in wing span direction W or second composite stringer 32 to extend along composite upper wing skin 22 in wing span direction W. Method 124 further includes step 134 for co-curing composite spar 24 into securement with composite lower wing skin 20 and with composite upper wing skin 22 along with further co-curing into securement at least one of: composite stringer 26 with web 28 of composite spar 24; first composite stringer 30 with composite lower wing skin 20; or second composite stringer 32 with composite upper wing skin 22.

Step 130 of laying up composite spar 24 further includes forming first composite trough configuration 34 which includes: first web 36; first curved transition wall portion 38 which extends from first end portion 40 of first web 36 to first flange 42; and second curved transition wall portion 44 which extends from second end portion 46 of first web 36 to second flange 48. Step 130 of laying up composite spar 24 further includes forming second composite trough configuration 50 which includes: second web 52; first curved transition wall portion 54 which extends from first end portion 56 of second web 52 to first flange 58; and second curved transition wall portion 60 which extends from second end portion 62 of second web 52 to second flange portion 64.

Step 130 of laying up composite spar 24 includes positioning first web portion 36 of first composite trough configuration 34 into abutting relationship with second web portion 52 of second composite trough configuration 50. Step 134 of co-curing includes co-curing into securement first web portion 36 of first composite trough configuration 34 and second web portion 52 of second composite trough configuration 50.

Step 132 of laying up at least one of: composite stringer 26, first composite stringer 30 or second composite stringer 32 further includes a step of forming the at least one of: the composite stringer 26 into hat stringer 66, first composite stringer 30 into first hat stringer 84 or second composite stringer 32 into second hat stringer 96. The step of laying up hat stringer 66 of composite stringer 26 includes: forming cap portion 68 and first curved transition wall portion 73 positioned between cap portion 68 and first leg 70 and second curved transition wall portion 75 positioned between cap portion 68 and second leg 72. First and second legs 70, 72 extend in opposite directions relative to cap portion 68. First and second legs 70, 72 each extend along web 28 of the composite spar 28. Step 134 of co-curing into securement composite stringer 26 with web 28 of composite spar 24 includes co-cure securement of first and second leg portions 70, 72 with web 28 of composite spar 24.

Step 132 which includes laying up at least one of first or second composite stringers 30, 32 further includes: forming first composite stringer 30 into hat stringer 84 including first cap portion 86, first curved transition wall portion 88 positioned between first cap portion 86 and first leg 90 and second curved transition wall portion 92 positioned between first cap portion 86 and second leg 94. First and second legs 90, 94 extend in opposite directions relative to first cap portion 86. First and second legs 90, 94 each extend along composite lower wing skin 20. Further included in step 132 is forming second composite stringer 32 into hat stringer 96 including second cap portion 98, first curved transition wall portion 100 positioned between second cap portion 98 and first leg 102 and second curved transition wall portion 104 positioned between second cap portion 98 and second leg 106. First and second legs 102, 106 extend in opposite directions relative to second cap portion 98. First and second legs 102, 106 each extend along composite upper wing skin 22.

While various embodiments have been described above, this disclosure is not intended to be limited thereto. Variations can be made to the disclosed embodiments that are still within the scope of the appended claims.

What is claimed:

1. An aircraft, comprising:
   a center wing box assembly positioned within a fuselage of the aircraft and positioned between and connected to a wing of the aircraft;
   the center wingbox assembly comprises a composite lower wing skin;
   the center wingbox assembly comprises a composite upper wing skin;
   at least two composite spars, extend between the composite lower wing skin and the composite upper wing skin, within the center wing box assembly; and
   a composite stringer, extends along in a wingspan direction and has a co-cured securement to each web of each of the at least two composite spars, within the center wing box assembly, wherein the at least two composite spars have a co-cured securement with the composite lower wing skin and with the composite upper wing skin, within the center wing box assembly.

2. The aircraft of claim 1, further includes at least one of:
   a first composite stringer extends along the composite lower wing skin; and
   a second composite stringer extends along the composite upper wing skin.

3. The aircraft of claim 2, wherein the at least one of:
the first composite stringer extends in the wing span direction and has a co-cured securement with the composite lower wing skin; and
the second composite stringer extends in the wing span direction and has a co-cured securement with the composite upper wing skin.

4. The aircraft of claim 1, wherein each of the at least two composite spars comprises:
a first composite trough configuration which comprises a first web, wherein:
a first curved transition wall portion extends from a first end portion of the first web and to a first flange of the first composite trough configuration;
the first flange extends along the composite lower wing skin;
a second curved transition wall portion extends from a second end portion of the first web and to a second flange of the first composite trough configuration; and
the second flange extends along the composite upper wing skin; and
a second composite trough configuration which has a second web, wherein:
a first curved transition wall portion extends from a first end portion of the second web and to a first flange of the second composite trough configuration,
the first flange extends along the composite lower wing skin;
a second curved transition wall portion extends from a second end portion of the second web and to a second flange of the second composite trough configuration; and
the second flange of the second composite trough configuration extends along the composite upper wing skin.

5. The aircraft of claim 4, wherein:
the first web of the first composite trough configuration abuts and has a co-cured securement with the second web of the second composite trough configuration;
the first flange of the first composite trough configuration has a co-cured securement with the composite lower wing skin;
the first flange of the second composite trough configuration has a co-cured securement with the composite lower wing skin;
the second flange of the first composite trough configuration has a co-cured securement with the composite upper wing skin; and
the second flange of the second composite trough configuration has a co-cured securement with the composite upper wing skin.

6. The aircraft of claim 1, wherein:
the composite stringer comprises a hat stringer which comprises a cap portion, a first curved hat stringer transition wall portion positioned between the cap portion and a first leg and a second curved hat stringer transition wall portion positioned between the cap portion and a second leg, wherein:
the first and second legs extend in opposite directions relative to the cap portion; and
the first and second legs each extend along the web of each of the at least two composite spars.

7. The aircraft of claim 6, wherein:
a first composite radius filler member is positioned adjacent a location of the first curved hat stringer transition wall portion of the hat stringer; and
a second composite radius filler member is positioned adjacent a location of to the second curved hat stringer transition wall portion of the hat stringer.

8. An aircraft, comprising:
a center wing box assembly positioned within a fuselage of the aircraft and positioned between and connected to wings of the aircraft;
the center wing box assembly comprises a composite lower wing skin;
the center wing box assembly comprises a composite upper wing skin;
a composite spar extends between the composite lower wing skin and the composite upper wing skin with a composite stringer secured to the composite spar, within the center wing box assembly; and
at least one of a first composite stringer within the center wing box assembly, which extends along the composite lower wing skin and a second composite stringer within the center wing box assembly, which extends along the composite upper wing skin; wherein:
the composite spar has a co-cured securement with the composite lower wing skin and with the composite upper wing skin within the center wing box assembly; and
the at least one of the first composite stringer has a co-cured securement with the composite lower wing skin within the center wing box assembly and the second composite stringer has a co-cured securement with the composite upper wing skin within the center wing box assembly.

9. The aircraft of claim 8, further includes the composite stringer extends in a wing span direction along a web of the composite spar.

10. The aircraft of claim 8, wherein the at least one of:
the first composite stringer extends in a wing span direction; and
the second composite stringer extends in the wing span direction.

11. The aircraft of claim 8, wherein the composite spar comprises:
a first composite trough configuration which comprises a first web, wherein:
a first curved transition wall portion extends from a first end portion of the first web and to a first flange of the first composite trough configuration;
the first flange extends along the composite lower wing skin;
a second curved transition wall portion extends from a second end portion of the first web and to a second flange of the first composite trough configuration; and
the second flange extends along the composite upper wing skin; and
a second composite trough configuration which has a second web, wherein:
a first curved transition wall portion which extends from a first end portion of the second web and to a first flange of the second composite trough configuration;
the first flange of the second composite trough configuration extends along the composite lower wing skin;
a second curved transition wall portion extends from a second end portion of the second web and to a second flange of the second composite trough configuration; and the second flange of the second composite trough configuration extends along the composite upper wing skin.

12. The aircraft of claim 11, wherein:
the first web of the first composite trough configuration abuts and has a co-cured securement with the second web of the second composite trough configuration;
the first flange of the first composite trough configuration has a co-cured securement with the composite lower wing skin;
the first flange of the second composite trough configuration has a co-cured securement with the composite lower wing skin;
the second flange of the first composite trough configuration has a co-cured securement with the composite upper wing skin; and
the second flange of the second composite trough configuration has a co-cured securement with the composite upper wing skin.

13. The aircraft of claim 8, wherein:
the first composite stringer comprises a first hat stringer which comprises a first cap portion, a first curved hat stringer transition wall portion positioned between the first cap portion and a first leg and a second curved hat stringer transition wall portion positioned between the first cap portion and a second leg, wherein:
the first and second legs extend in opposite directions relative to the first cap portion; and
the first and second legs each extend along the composite lower wing skin; and
the second composite stringer comprises a second hat stringer which comprises a second cap portion, a first curved hat stringer transition wall portion positioned between the second cap portion and a first leg and a second curved hat stringer transition wall portion positioned between the second cap portion and a second leg, wherein:
the first and second legs extend in opposite directions relative to the second cap portion; and
the first and second legs each extend along the composite upper wing skin;
the co-cured securement of the first hat stringer with the composite lower wing skin includes the first and second legs in co-cured securement with the composite lower wing skin; and
the co-cured securement of the second hat stringer with the composite upper wing skin includes the first and second legs in co-cured securement with the composite upper wing skin.

14. The aircraft of claim 13, wherein:
a third composite radius filler member is positioned adjacent to a location of the first curved hat stringer transition wall portion of the first hat stringer;
a fourth composite radius filler member is positioned adjacent to a location of the second curved hat stringer transition wall portion of the first hat stringer;
a fifth composite radius filler member is positioned adjacent to a location of the first curved hat stringer transition wall portion of the second hat stringer; and
a sixth composite radius filler member is positioned adjacent to a location of the second curved hat stringer transition wall portion of the second hat stringer.

15. A method for assembling of an aircraft, comprising steps of:
laying up a composite lower wing skin for a center wing box assembly, which is for positioning within a fuselage of the aircraft and for positioning between and for connecting to wings of the aircraft;
laying up a composite upper wing skin for the center wing box assembly, which is for positioning within the fuselage of the aircraft and for positioning between and for connecting to wings of the aircraft;
laying up a composite spar and a composite stringer to extend along a web of the composite spar of the center wing box assembly with the composite spar extending between the composite lower wing skin and the composite upper wing skin; and
laying up at least one of:
a first composite stringer to extend along the composite lower wing skin in the wing span direction and a second composite stringer to extend along the composite upper wing skin in the wing span direction; and
co-curing the composite spar, the composite stringer, the composite lower wing skin and the composite upper wing skin securing the stringer to the web of the spar and the spar to the lower wing skin and the upper wing skin and further co-curing into securement at least one of:
the composite stringer with the web of the composite spar;
the first composite stringer with the composite lower wing skin; and
the second composite stringer with the composite upper wing skin, wherein the composite lower wing skin, the composite upper wing skin, the composite spar, composite stringer and at least one of first composite stringer or second composite stringer are positioned within the fuselage.

16. The method for assembling of claim 15, wherein the step of laying up the composite spar includes:
forming a first composite trough configuration which includes:
a first web;
a first curved transition wall portion which extends from a first end portion of the first web to a first flange; and
a second curved transition wall portion which extends from a second end portion of the first web to a second flange; and
forming a second composite trough configuration which includes:
a second web;
a first curved transition wall which extends from a first end portion of the second web to a first flange; and
a second curved transition wall portion which extends from a second end portion of the second web to a second flange.

17. The method for assembling of claim 16, wherein:
the step of laying up the composite spar includes positioning a first web of the first composite trough configuration into abutting relationship with a second web of the second composite trough configuration; and
the step of co-curing includes co-curing into securement the first web of the first composite trough configuration and the second web of the second composite trough configuration.

18. The method for assembling of claim 15, wherein the step of laying up at least one of the composite stringer, the first composite stringer or the second composite stringer includes a step of forming the at least one of the composite stringer into a hat stringer, the first composite stringer into a first hat stringer and the second composite stringer into a second hat stringer.

19. The method for assembling of claim 18, wherein:
the step of laying up the hat stringer of the composite stringer includes forming a cap portion and a first curved transition wall portion positioned between the cap portion and a first leg and a second curved transition wall portion positioned between the cap portion and a second leg, wherein:
the first and second legs extend in opposite directions relative to the cap portion; and
the first and second legs each extend along the web of the composite spar; and
the step of co-curing into securement the composite stringer with the web of the composite spar includes co-cured securement of the first and second legs with the web of the composite spar.

20. The method for assembling of claim 18, wherein the step of laying up the first or second composite stringers further includes:
forming the first composite stringer into a hat stringer which includes a first cap portion, a first curved transition wall portion positioned between the first cap portion and a first leg and a second curved transition wall portion positioned between the first cap portion and a second leg, wherein:
the first and second legs extend in opposite directions relative to the first cap portion; and
the first and second legs each extend along the composite lower wing skin and
forming the second composite stringer into a hat stringer which includes a second cap portion, a first curved transition wall portion positioned between the second cap portion and a first leg and a second curved transition wall portion positioned between the second cap portion and a second leg, wherein:
the first and second legs extend in opposite directions relative to the second cap portion; and
the first and second legs each extend along the composite upper wing skin.

* * * * *